(No Model.)
F. BLUMENSTEIN & E. BOBSIEN.
SPEED INDICATOR AND ALARM.
No. 550,775. Patented Dec. 3, 1895.
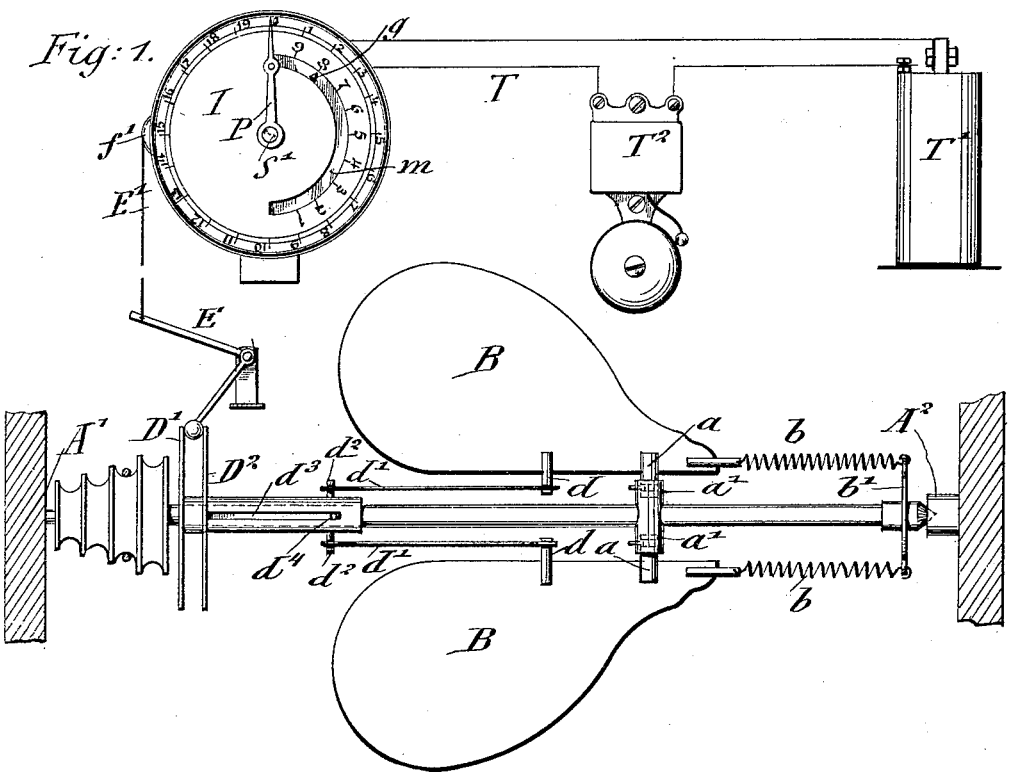
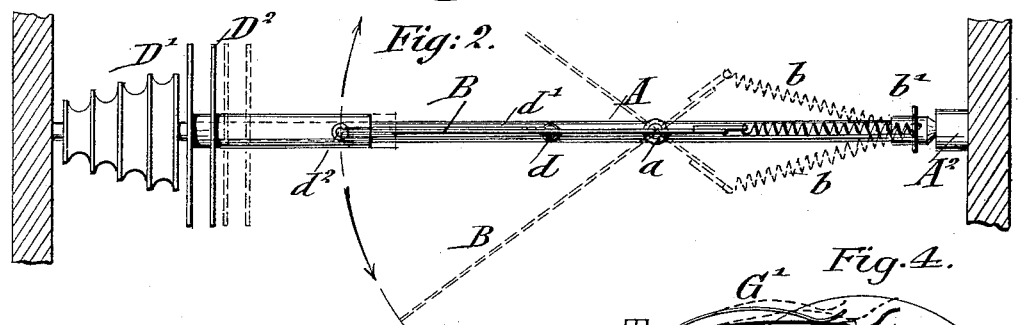
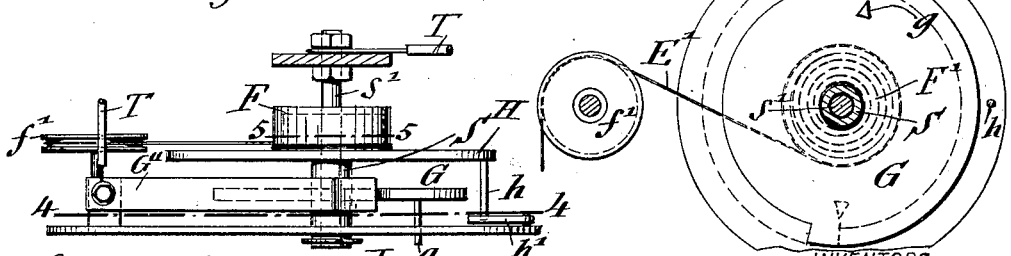
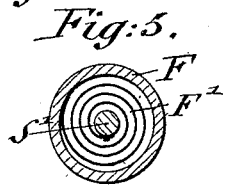
WITNESSES:
George W. Jaeckel
John J. McCauley
INVENTORS
Franz Blumenstein
Ernst Bobsien
BY
ATTORNEYS.

UNITED STATES PATENT OFFICE.

FRANZ BLUMENSTEIN AND ERNST BOBSIEN, OF MOUNT VERNON, NEW YORK.

SPEED-INDICATOR AND ALARM.

SPECIFICATION forming part of Letters Patent No. 550,775, dated December 3, 1895.

Application filed May 13, 1895. Serial No. 549,064. (No model.)

*To all whom it may concern:*

Be it known that we, FRANZ BLUMENSTEIN and ERNST BOBSIEN, citizens of the United States, and residents of Mount Vernon, in the county of Westchester and State of New York, have invented certain new and useful Improvements in Speed-Indicators for Trolley-Cars, of which the following is a specification.

This invention relates to an improved speed-indicator for trolley and other street-railway cars, which is so constructed that when the speed of the car exceeds the speed prescribed by law the pointers operate on a suitable dial and an electric circuit is closed and an alarm is given which informs the motorman and conductor, as well as the passengers, that the legal speed is passed, so that the motorman can reduce the speed of the car and keep the same at the required maximal permitted speed.

The invention consists of an automatic speed-indicator for trolley-cars, which comprises spring-actuated wings that are fulcrumed to an auxiliary shaft that is driven from one of the axles of the car, said wings being connected by rods with a longitudinally-sliding sleeve on said auxiliary shaft, which sleeve is provided with disks that engage one arm of a fulcrumed bell-crank lever, the upper arm of which is connected by the operating-cord with the pointer of a suitable indicator, and said pointer having a sleeve which carries a contact-disk, which is adapted to engage a spring-contact and close the circuit containing one or more alarm-bells, by which the signals are given to the motorman and conductor, as well as to the passengers, whenever the speed exceeds a certain prescribed limit.

In the accompanying drawings, Figure 1 represents a side elevation of our improved speed-indicator for trolley-cars, showing its connection with the indicator and the electric alarm-circuit. Fig. 2 is a side view of the auxiliary shaft and swiveled wings, showing the latter thrown outward in dotted lines. Fig. 3 is a top view of the indicator, on an enlarged scale, showing the switch connection of the same. Fig. 4 is a section on line 4 4, Fig. 3; and Fig. 5 is a cross-section on line 5 5, Fig. 3.

Similar letters of reference indicate corresponding parts.

Referring to the drawings, A represents an auxiliary shaft which is supported in suitable bearings $A'$ $A^2$ and driven by a belt-and-pulley connection or by a chain and sprocket-wheel (not shown) from one of the axles of the car, so that rotary motion is imparted to the auxiliary shaft at the same or greater speed than the axle.

Actuating-wings B are connected by swivel-joints to the auxiliary shaft A by means of swivel-pins $a$, which extend at right angles to the inner edges of the wings and have bearing in sockets $a'$, extending from diametrically-opposite sides of the shaft. The wings B are arranged thereby at diametrically-opposite sides of the shaft and in the same plane with each other when the car is at a point of rest. The tapering ends of the wings B are connected by helical springs $b$ with a cross-piece $b'$, fixed on the shaft A, while at the opposite sides of the fulcrums the wings are provided with studs that are pivoted to connecting-rods $d'$, which are pivoted to pins $d^2$ of a sleeve D, which is longitudinally guided on the shaft A by means of a slot $d^3$ and guide-pin $d^4$, so as to prevent it from being axially shifted on the shaft. On the sleeve D are placed two disks $D'$ $D^2$, which are arranged at a suitable distance from each other and which engage the ball-shaped end of a fulcrumed bell-crank lever E, the upper arm of which is connected by a cord $E'$ with a spring-actuated drum F of an indicator I.

The dial-plate of the indicator is subdivided in a suitable circumferential scale $I'$, as shown, and provided with a pointer P, that is operated by a spring-actuated drum F, which is turned against the tension of its spring $F'$ by the cord $E'$, that is carried over guide-pulley $f'$ and then around the drum F, the end of the cord or chain F being attached to the drum. The connection of the spring-drum with the pointer P is made by means of a sleeve S, which turns on the arbor $S'$ of the indicator. On the sleeve S of the spring-drum is located a contact-disk G, one half of which is of less radius than the other half, so that the larger part can be used to contact with a contact-spring G', which closes the circuit T of an electric battery T', in which circuit one or more alarm-bells T² are arranged, one preferably near the front of the car for the motorman and one near the rear of the car for the conductor. The indicator I is arranged in the car so as to be readily observed by the conductor as well as by the passengers.

On the sleeve S of the spring-drum F is arranged a wheel H, which is provided with a lateral pin $h$ near its periphery, which is engaged by a pawl $h'$, pivoted on the dial-plate of the indicator, so that the wheel and the contact-disk G are stopped when the pointer P makes one entire revolution, the relative position of the pawl and the pin $h$ being such that the pointer is maintained by the action of the spring-drum at zero when the car is at rest.

As soon as the car is started the impact of the air against the wings B can turn the same in opposite direction to each other against the tension of the springs $b$, so that by the increasing resistance of the air as the speed increases the longitudinally-sliding sleeve D is moved more and more inwardly on the shaft, and thereby through the disks D' D² the bell-crank E, connecting-cord E', spring-drum F, and the pointer P on the indicator are moved, which pointer vibrates forward and backward on the dial-plate of the indicator according as the speed is increased or decreased.

When the prescribed speed (eight miles an hour) is reached, the pointer P of the indicator arrives at eight, and the larger portion of the contact-disk G forms contact with the contact-spring G', as shown by dotted lines in Fig. 4, and closes the electric circuit, so as to ring the alarm bell or bells and thus audibly indicate that the prescribed speed is reached and that the motorman must reduce the speed within the proper limit. The contact-disk G is provided on its outer face with an auxiliary or setting hand $g$, which projects through a curved slot $m$ in the dial-plate of the indicator, said slot being concentric with the arbor S' and said dial-plate bearing a series of numbers which are adjacent to the slot $m$ and read in opposite direction to the outer or circular series of numbers for the pointer P. The contact-disk is held frictionally on the sleeve S and can be turned thereon by hand and the setting-hand $g$ thereof thereby placed against the number which indicates the desired maximum speed, (the drawing showing the same as eight miles an hour,) whereby the indicator can be adapted for intermural and suburban roads, which are usually operated within varying limits of speed.

It will be observed that by shifting the contact-disk the contact is established by the enlarged portion thereof sooner or later.

When the car is stopped, the wings B are returned by the springs $b$ to their normal position in a diametrical plane, while the pointer I of the indicator is returned to zero. The setting-hand should of course be reset by hand to the desired maximum speed.

The indicator is comparatively simple in construction and can be applied with little expense to a trolley-car or any other street-railway cars, serving in a reliable and effective manner for indicating the speed of cars, so that they need not be run at greater than the prescribed speed.

Having thus described our invention, we claim as new and desire to secure by Letters Patent—

1. In a speed-indicator for trolley-cars, the combination with the indicator proper consisting of a dial-plate, an arbor, a sleeve journaled on the arbor and carrying a pointer adapted to sweep across the face of the dial-plate, a spring-drum arranged on the arbor and connected to said sleeve, a contact-disk provided with an enlarged portion and placed on said sleeve, a spring-contact, and alarm circuit connected with the latter and with the contact-disk, of an operating-cord wound at one end on the spring-drum, and mechanism with which the other end of said cord is connected whereby by the rotation of the axle a corresponding pull is imparted on the cord, substantially as set forth.

2. In a speed-indicator for trolley-cars, the combination of an auxiliary shaft adapted to be rotated from one of the axles of the car, spring-actuated wings swiveled to said shaft and located normally in one plane with the axis of the same, a longitudinally-guided sleeve on the auxiliary shaft, means for connecting the wings with said sleeve, an indicator provided with a pointer and with a rotating contact-disk having an enlarged portion, a spring-contact, an electric alarm circuit connected with the contact and contact-disk, and means connected with said sleeve and with the pointer for moving the latter across the dial-plate of the indicator and establishing contact between the contact-disk and the spring-contact, substantially as set forth.

3. A speed-indicator for trolley-cars, consisting of an auxiliary shaft adapted to be rotated from one of the axles of said car, wings swiveled to said shaft, and located in one plane with the axle of the same, a spring connecting one end of each of said wings with a cross-piece on said shaft, a longitudinally-sliding sleeve on said shaft, connecting-rods between the sleeve and the wings, a bell-crank lever one end of which is engaged by disks on said shaft, an actuating cord connected with the other arm of said bell-crank lever, an indicator provided with a pointer operated by said cord, a contact-disk on the sleeve which carries the pointer, a spring-contact and electric circuit connected with said contact and contact-disk and provided with an alarm bell so as to indicate when the maximal speed is reached, substantially as set forth.

4. A speed-indicator for trolley-cars consisting of an indicator proper provided with a dial-plate having a circular series of numbers, said dial plate also having a curved concentric slot and an auxiliary series of numbers, reading in opposite direction to the other numbers, a sleeve mounted on the arbor of the indicator and provided with a pointer, a contact-disk mounted on said sleeve and held by friction, said disk having an enlarged side portion and a setting-hand projecting into the slot of the dial-plate, a spring-contact, an electric alarm circuit connected with the latter and the contact-disk, a spring-drum arranged on the arbor, and mechanism for connecting said drum with an axle of a car, whereby when the axle rotates a corresponding movement is imparted to the drum, substantially as set forth.

In testimony that we claim the foregoing as our invention we have signed our names in presence of two subscribing witnesses.

FRANZ BLUMENSTEIN.
ERNST BOBSIEN.

Witnesses:
PAUL GOEPEL,
GEORGE W. JAEKEL.